US008990008B2

(12) United States Patent
Voβen et al.

(10) Patent No.: US 8,990,008 B2
(45) Date of Patent: Mar. 24, 2015

(54) TECHNIQUE FOR DETERMINING POINTS OF INTEREST FOR A NAVIGATION DEVICE

(75) Inventors: Tim Voβen, Bonn (DE); Christian Reinhard, Roethenbach an der Pegnitz (DE)

(73) Assignee: Elektrobit Automotive GmbH, Erlangen (DE)

( * ) Notice: Subject to any disclaimer, the term of this patent is extended or adjusted under 35 U.S.C. 154(b) by 225 days.

(21) Appl. No.: 13/191,032

(22) Filed: Jul. 26, 2011

(65) Prior Publication Data

US 2012/0022782 A1  Jan. 26, 2012

(30) Foreign Application Priority Data

Jul. 26, 2010  (DE) .......................... 10 2010 032 229

(51) Int. Cl.
*G01C 21/00* (2006.01)
*G01C 21/36* (2006.01)

(52) U.S. Cl.
CPC ................................. *G01C 21/3679* (2013.01)
USPC ........... 701/410; 340/988; 707/706; 715/765; 715/700

(58) Field of Classification Search
USPC ................... 701/400, 410; 340/988; 707/706; 715/765, 700
See application file for complete search history.

(56) References Cited

U.S. PATENT DOCUMENTS

| 6,873,851 | B2 * | 3/2005 | Brown et al. | 455/456.3 |
|---|---|---|---|---|
| 7,353,109 | B2 * | 4/2008 | Han | 701/408 |
| 8,204,877 | B2 * | 6/2012 | Uchida et al. | 707/718 |
| 8,214,344 | B2 * | 7/2012 | Kruglick | 707/769 |
| 8,239,130 | B1 * | 8/2012 | Upstill et al. | 701/426 |
| 8,364,689 | B2 * | 1/2013 | Hao | 707/758 |
| 8,462,175 | B2 * | 6/2013 | Ogata et al. | 345/619 |
| 8,560,228 | B2 * | 10/2013 | Feldbauer | 701/426 |
| 2005/0177303 | A1 * | 8/2005 | Han | 701/209 |
| 2006/0089788 | A1 * | 4/2006 | Laverty | 701/202 |
| 2006/0253408 | A1 * | 11/2006 | Dvorak | 707/1 |
| 2007/0270159 | A1 * | 11/2007 | Lohtia et al. | 455/456.1 |
| 2008/0134088 | A1 * | 6/2008 | Tse et al. | 715/810 |

(Continued)

FOREIGN PATENT DOCUMENTS

| DE | 102007055411 A1 | 3/2009 |
|---|---|---|
| EP | 1369668 A2 | 12/2003 |
| EP | 1269119 B1 | 6/2004 |
| JP | 2002333336 A * | 11/2002 |

(Continued)

OTHER PUBLICATIONS

Yongkwon Kim, Kisung Lee, Kyungho Choi, Seong Ik Cho, "Building Recognition for Augmented Reality Based Navigation System," Publication Year: 2006, p. 131.*

(Continued)

*Primary Examiner* — Tuan C. To
(74) *Attorney, Agent, or Firm* — Westerman, Hattori, Daniels & Adrian, LLP

(57) ABSTRACT

The disclosure relates to a method for identifying points of interest, or POIs, in a vicinity of a predetermined location on the basis of digital cartographic data and a predetermined search time and a predetermined number of POI hits. The method comprises the steps of identifying, on the basis of cartographic data, an initial search field that includes the predetermined location, searching for a POI in the search field, and iteratively enlarging the search field and searching for the POI in the enlarged search field until the predetermined search time has elapsed or the predetermined number of POI hits has been attained.

15 Claims, 2 Drawing Sheets

(56) References Cited

U.S. PATENT DOCUMENTS

| | | |
|---|---|---|
| 2009/0070293 A1 | 3/2009 | Vechersky |
| 2009/0150349 A1 | 6/2009 | Cartin et al. |
| 2009/0181699 A1* | 7/2009 | Tysowski ............ 455/457 |
| 2009/0265340 A1 | 10/2009 | Barcklay et al. |
| 2009/0271400 A1* | 10/2009 | Uchida et al. ............ 707/5 |
| 2010/0076968 A1* | 3/2010 | Boyns et al. ............ 707/732 |
| 2010/0125406 A1* | 5/2010 | Prehofer ............ 701/201 |
| 2010/0199213 A1* | 8/2010 | Suzuki ............ 715/784 |
| 2010/0332524 A1* | 12/2010 | Uchida et al. ............ 707/769 |
| 2011/0010650 A1* | 1/2011 | Hess et al. ............ 715/765 |

FOREIGN PATENT DOCUMENTS

| | | |
|---|---|---|
| WO | 01/69178 A1 | 9/2001 |
| WO | 2009/026871 A1 | 3/2009 |
| WO | 2009/036052 A1 | 3/2009 |
| WO | 2009/083719 A1 | 7/2009 |

OTHER PUBLICATIONS

Yang Yang, Yang Diange, Zhang Tao, Li Ting, "Retrieval method of enormous POI in vehicle navigation system," Publication Year: 2009, pp. 1345-1349.*

European Search Report dated Jan. 13, 2014, issued in European Patent Application No. 11006134.8 (7 pages).

* cited by examiner

TECHNIQUE FOR DETERMINING POINTS OF INTEREST FOR A NAVIGATION DEVICE

TECHNICAL FIELD

The present disclosure relates to a technique for determining points of interest on the basis of digital cartographic data for a navigation device. This technique may be used in combination with a destination input.

BACKGROUND

In connection with navigation devices (including route planners), the term "points of interest", or POIs in short, refers to locations that are of particular interest to a user because of service offerings, tourist attractions or leisure offerings. For example, filling stations, pharmacies, cash dispensers, vehicle repair shops, accommodation, museums, cinemas or other tourist attractions can be identified as POIs. POIs can be indicated visually (for example, in the form of symbols or POI lists) or acoustically by a navigation device.

The search for POIs by a navigation device usually begins with the user specifying a POI class (e.g. filling station) in the course of inputting a destination. Then, on the basis of cartographic data and the current position, the navigation device identifies all POIs of the predetermined POI class within a predetermined search radius. The search radius in this case can be preset in the navigation device or can be predetermined by the user.

A method for inputting a destination on a navigation device is known from EP 1 269 119 B1, wherein a user is provided with a destination name list for selection of a destination, a distance criterion being used for compilation of the list. For this purpose, all previously stored destination names that lie within a predefined search radius, or within a search radius predetermined by the user, are retrieved from a memory and made available to the user, in the form of a destination name list.

A method of searching for POIs on the basis of a predetermined search radius can be disadvantageous, since the search time, which is proportional to the number of POIs that are processed within the predetermined search radius, is not predictable. Thus, for example, in the case of a search radius in a densely populated region (for example, in metropolitan areas), a POI search can result in a large number of POI hits, with the result that, on the one hand, the search time is greatly increased and, on the other hand, the search result cannot be indicated in a clear manner. In particular, processing and indication of a large number of POI hits place unnecessary demands on resources of the navigation device that would otherwise be available for other operations. This problem can be rectified, for example, if the search radius in each case is adapted to the conditions of a search location. Specifying a suitable search radius is difficult, however, since the user does not know in advance how many POIs are located within the predetermined search radius.

SUMMARY

It is an object to provide a method and a device for determining POIs, which method and device avoid at least one of the above-mentioned or other disadvantages.

To achieve this object, there is provided a method for identifying points of interest (POIs) in a vicinity of a predetermined location with known coordinates, on the basis of digital cartographic data and a predetermined search time and a predetermined number of POI hits, the method comprising the following steps: identifying, on the basis of the cartographic data, an initial search field that includes the predetermined location; searching for POIs in the search field; and iteratively enlarging the search field and searching for POIs in the enlarged search field until the predetermined search time has expired or the number of found POIs attains the predetermined number of POI hits. The method can be executed by a navigation device in the course of input of a destination.

In this way, it may be ensured, on the one hand, that the POI search in the navigation device remains limited to an appropriate period of time and resources of the navigation device are therefore not taken up unnecessarily by POI determination. On the other hand, the number of POI hits can already by limited in advance—irrespective of the number of POIs within a particular search field. The predetermined number of POI hits can also be 1.

The POIs may be divided into different POI classes. For instance, POIs of the class "filling station", "pharmacy", "cinema", etc. may be combined to form a POI class, respectively. These classes may be divided into sub-classes (e.g., with regard to filling stations of different suppliers). During POI determination POIs of at least one predetermined POI class or POI sub-class may be determined within the search filed.

According to a further implementation, the search time and number of POI hits are predetermined for each of the at least one predetermined POI class, wherein the search filed is enlarged until the predetermined search time has elapsed or $N_S$ POI hits for each predetermined POI class are attained. The event which occurs earlier, causes the termination of the POI determination. For instance, two or more POI classes may be selected for a POI determination and one common or different numbers of POI hits may be assigned to the two or more POI classes. The POI determination will be terminated when the assigned number of POI hits for each of the two or more POI classes is reached, provided that the predetermined search time has not elapsed before.

Further, for the POI search in the search filed POIs of the same or different classes may be spatially grouped, wherein POIs geographically close to one another are combined to form a POI cluster and stored in a data storage. By spatially combining POIs to POI clusters the POI search in the search filed can be accelerated, wherein one POI cluster is respectively retrieved from the data storage and pre-processed before the individual POIs of the corresponding retrieved POI cluster are further processed.

An elapsed search time may be determined and updated during the search process (for instance, after each POI cluster processing). The elapsed search time is then compared with the predetermined search time. In case the elapsed search time exceeds the predetermined search time, the POI determination terminates. Otherwise, the processing (for instance, of a further POI cluster) continues. Alternatively thereto the elapsed search time may be determined and updated after each search field enlargement or after each POI hit and may be compared with the predetermined search time.

The elapsed search time may be determined from a difference between a current instant (e.g. after processing of a POI cluster) and an instant at which the POI search commenced. A timer that measures the time from the start of POI determination can be used to determine the elapsed search time. As an alternative to this it is possible to use, for example, a processor clock pulse, by determining the number of processor cycles between the instant at which the search commenced and the current instant.

The predetermined search time can be programmed in a fixed manner or can be configurable by a user. Appropriate values for the predetermined search time are in the range between 50 milliseconds and 10 seconds. Further, a threshold value can be provided for the search time, the threshold value being calculated as the difference of the predetermined search time and a time margin. The time margin can be set so as to be variable relative to the predetermined search time (as an absolute value or a percentage value in relation to the predetermined search time). The threshold value is provided to terminate POI determination upon attainment of the threshold value and before the predetermined search time is yet attained. In this way, the probability of the predetermined search time being exceeded during two consecutive search-time measurements is reduced.

In addition to the predetermined search time the predetermined number of POI hits can be used for ending POI determination. For this purpose, after processing of a POI cluster, a current number of hits can be determined or updated and compared with the predetermined number of hits. If the current number of hits attains or exceeds the predetermined number of hits, POI determination is terminated. Otherwise, for example, the processing of a further POI cluster proceeds. As an alternative thereto, the current number of hits can be determined or updated after each search-field enlargement or after each POI hit within a POI cluster, and compared with the predetermined number of POI hits. According to a further embodiment, it is also possible—in a manner very similar to that for the time margin—to define a margin for the predetermined number of POI hits. In this way, POI determination can be terminated upon attainment of a threshold, before the predetermined number of POI hits is yet attained, the threshold being calculated as the difference of the predetermined number of POI hits and the margin. The probability of the predetermined number of POI hits being exceeded during two consecutive search-time measurements can thus be reduced.

In the case of the POI search, the search field that includes the predetermined location is enlarged iteratively until the predetermined search time or the predetermined number of POI hits have been attained or the iteratively enlarged search field has attained a predetermined threshold value for the search field size (depending on which result is obtained first). In this case, an enlargement of the search field is performed, for example, when all POI clusters present in the search field have been processed beforehand.

The initial search field can be selected so as to be sufficiently small such that only few POIs, or few POI clusters, are located within the initial search field. The size of the initial search field can be selected, for example, on the basis of a stored local POI density that can be assigned to the cartographic data. An initially small search field has the advantage that only few POI clusters, or POIs, are processed, thereby saving time and resources in the search operation. If there is no POI cluster present in the initial search field, the search field is enlarged until at least one POI cluster is found in the search field. The search field is preferably rectangular in form. The enlargement of the search field in this case can be effected in such a way that its area or all side lengths are doubled upon each enlargement step.

Further, the method can comprise the step of classifying the selected POIs in dependence on their distance from the predetermined location, as well as recording the classified POIs in a results list. The results list can be presented to a user in combination with input of a destination.

The present disclosure further provides a computer program product having a program code for performing the method when the computer program product is executed on a computer means. For this purpose, the computer program product can be stored on a computer-readable recording medium.

Furthermore, the present disclosure provides a device for determining points of interest, or POIs, in a vicinity of a predetermined location, with known coordinates, on the basis of digital cartographic data and a predetermined search time and a predetermined number of POI hits, the device comprising: a data memory for storing digital cartographic data; a determination means, which is set up to determine, on the basis of the cartographic data, an initial search field that includes the predetermined location and to iteratively enlarge the search field until the predetermined search time has elapsed or the number of found POIs attains the predetermined number of POI hits; and a search means, which is set up to search for POIs in the search field.

The device can further comprise an input means for inputting a predetermined search time and/or a predetermined number of POI hits, a means for determining the search time and number of POI hits during POI determination, a classifying means, which is set up to classify found POIs in dependence on their distance from the predetermined location and to record them in a results list, and an output means for indicating the results list.

According to one embodiment, the data memory can further comprise a POI database, in which POIs that are geographically close to one another are combined and stored as POI clusters. Further, local POI densities can be stored. These densities are each linked to the cartographic data in the data memory and are unambiguously assignable to these data.

According to a further embodiment, the device can comprise a means for establishing an online connection, in order to exchange data over a network. In this way, updated POI databases, updated cartographic data (and sections thereof) and/or cartographic data having a predetermined number and type of POI classes or POI clusters can be selected for POI determination. For this purpose, cartographic data can be preprocessed in the network according to a search wish, and made available to the device for POI determination. The use of preprocessed cartographic data having selected POI classes or POI clusters enables POI determination in the device to be further accelerated. Further, in this way, POI results can be made available within the network.

BRIEF DESCRIPTION OF THE DRAWINGS

Further details, advantages and aspects of the present disclosure described herein are given by the following drawings, wherein.

DETAILED DESCRIPTION

Figure 1:
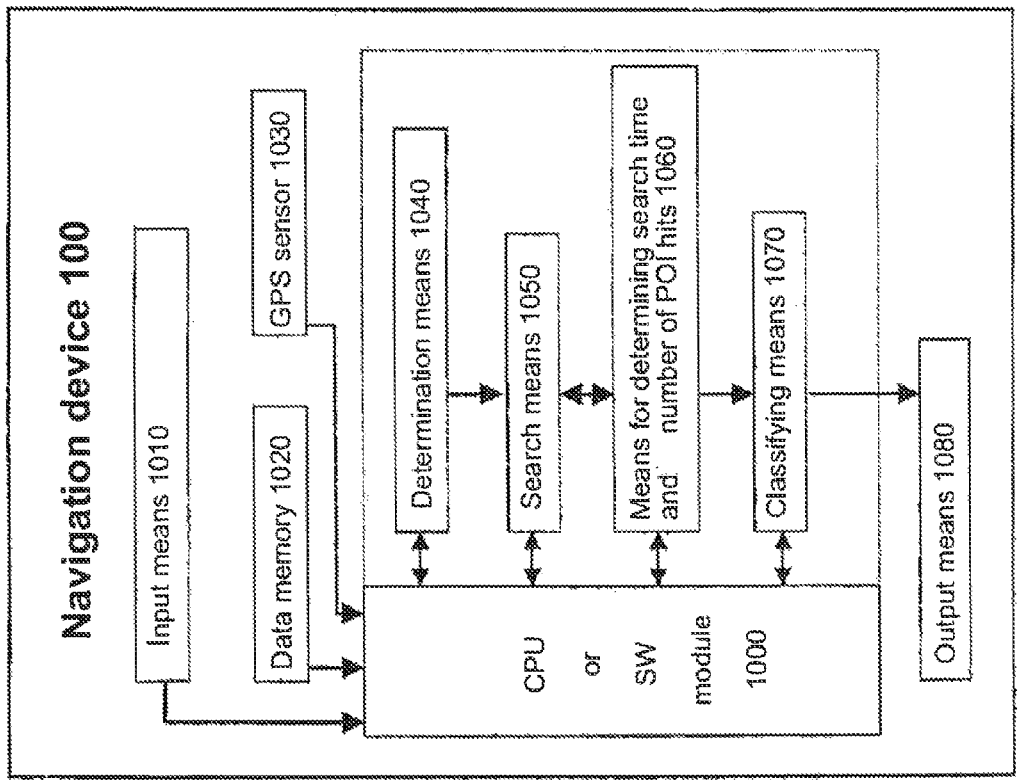
FIG. 1 shows a navigation device according to an embodiment of the present invention.

FIG. 1 shows, in the form of a block diagram, an embodiment of a device 100 according to the invention, in the form of a navigation device. The navigation device 100 can be integrated into a motor vehicle or realized as a portable device (personal navigation device, PND). It is understood that the device 100 or parts thereof can also be implemented, for example, in a computer (e.g. as a route planner), a personal digital assistant (PDA) or in a mobile telephone.

The navigation device 100 comprises a core functionality 1000 that can be implemented, for example, as a CPU (central processing unit) or as a microprocessor or as a software module (SW module). Further, the navigation device 100 comprises an input means 1010, a data memory 1020, a GPS sensor 1030, a determination means 1040, a search means 1050, a means for determining a search time and a number of is hits 1060, a classifying means 1070 and an output means 1080.

The determination means 1040, the search means 1050, the means for determining the search time and number of POI hits 1060 and the classifying means 1070 can each be implemented as an independent means that is in communication with the core functionality 1000 or as part of the core functionality 1000, as indicated by the broken-line extension of the core functionality 1000 in FIG. 1.

The input means 1010, the data memory 1020 and the GPS sensor 1030 are communicatively connected to the core functionality 1000. The core functionality 1000 obtains from the input means 1010 items of input information relating to a predetermined search time ($t_S$), a predetermined number of POI hits ($N_S$) and to a predetermined POI class. These items of information are input, at least in part (e.g. POI class) or in their entirety, by a user of the device 100. However, the predetermined search time ($t_S$) and/or the predetermined number of POI hits ($N_S$) can also be determined algorithmically by the core functionality 1000 or predetermined in a fixed manner. Further, the core functionality 1000 obtains positioning information via the GPS sensor 1030 and, via the data memory 1020, obtains information relating to previously stored cartographic data and relating to POIs.

In the data memory 1020, cartographic data are stored in a database. Further, the data memory 1020 comprises a POI database, in which POIs that are geographically close to one another are combined and stored in each case as POI clusters. The stored POI clusters in the POI database in this case are linked to the stored cartographic data, such that POI clusters can be assigned to individual cartographic regions (or portions thereof) defined by cartographic data.

The determination means 1040 determines, on the basis of the positioning information obtained from the GPS transmitter 1030 (or of geographical coordinates input by the user) and of the cartographic data retrieved from the data memory 1020, an initial search field that corresponds to a portion of a cartographic region around a location corresponding to the positioning information. In this case, the size of the initial search field is determined, for example, on the basis of data relating to local POI densities that are additionally stored in the data memory 1020. In any case, the size of the initial search field is selected by the determination means 1040 such that only few POI clusters, or POIs, are present in the search field. In this way, the subsequent POI determination performed by means of the search means 1050 is accelerated. The search means 1050 in this case analyses the POI clusters and POIs present in the search field, and selects those POIs that are assignable to a predetermined POI class. If the number of POIs found in the initial search field does not exceed the predetermined number of POI hits ($N_S$) and if the predetermined search time ($t_S$) has not elapsed, the determination means 1040 enlarges the search field, in order to identify further POIs.

During POI determination, the means 1060 for determining the search time and number of POI hits ascertains or updates an elapsed search time (t) and a current number of POI hits (N). The means 1060 further compares the ascertained values for the search time (t) and number of POI hits (N) with the values of the predetermined search time ($t_S$) and the predetermined number of POI hits ($N_S$), which each represent a threshold value for a termination of POI determination. For the purpose of determining the elapsed search time (t), the means 1060 preferably comprises a timer. As an alternative thereto, the means 1060 can determine the elapsed search time (t) by counting processor cycles of the core functionality 1000.

The classifying means 1070, finally, is set up to classify, in dependence on their distance from the predetermined location, the POIs found in the search field by the search means 1050, and to record them in a results list. The output means 1080 is set up to optically and/or acoustically output the classified POIs. In a preferred embodiment, the classified POIs are output in the form of a results list. As an alternative thereto, the Pals can be displayed as symbols, together with a visually generated map. Further, there can be a selection functionality for selecting one of the POIs as a destination point (e.g. for route planning and route guiding).

An embodiment of the method according to the invention for determining POIs in a vicinity of a predetermined location is explained in the following with reference to the flow diagram represented in FIG. 2. The method is explained on the basis of the navigation device 100 represented in FIG. 1, but can also be executed by devices configured in another way.

In a first step S1, the determination means 1040 is used to determine an initial search field on the basis of the location found by the GPS sensor 1030 and on the basis of cartographic data stored in the data memory 1020. The size of the initial search field in this case is selected, on the basis of the POI clusters stored in the data memory 1020, so as to be sufficiently small such that only few POI clusters are present in the initial search field and it is ensured that the method steps described in the following are executed in the navigation device 100 in a rapid manner that is sparing of resources.

At the same time, the first step S1 defines a start-time point for the determination of the elapsed search time (t) during the search operation. Preferably, the timer of the means 1060 is activated for this purpose.

In a second step S2, all POI clusters in the (initial) search field are identified. If there is no POI cluster present in the search field, the method proceeds with the steps S9 and S10, which are described further below. If the (initial) search field has at least one POI cluster, one POI cluster is first selected. The selection of the POI cluster in this case can be effected on the basis of determination of a distance from the predetermined location.

In the ensuing step S3, the selected POI cluster is retrieved from the data memory 1020 and processed. If the POI cluster comprises at least one POI, then a first POI is retrieved in step S4 and further processed by the search means 1050 in step S5. If, in this case, the retrieved POI can be assigned to the POI class predetermined (by the user), then, in step S6, the POI is entered as a POI hit in a results list. Otherwise, the retrieved POI is rejected. The method steps S4 to S6 are repeated iteratively until all POIs of the selected POI cluster have been processed.

If, in step S4, all POIs of the selected POI cluster have been retrieved for the processing in step S5, the method continues with step S7. In this case, the means 1060 is used first to determine the current number of POI hits and to compare this with the predetermined number of POI hits ($N_S$). If the current number of POI hits (N) exceeds the predetermined number of hits ($N_S$), the POI search operation is ended. If, however, the number of found POIs in the selected POI cluster is less than the predetermined number of POI hits ($N_S$), then, in a step S8, the elapsed search time (t) is determined and compared with the predetermined search time ($t_S$). If, in this case, the currently determined search time (t) exceeds a threshold value (T) for the predetermined search time ($t_S$), the POI search operation is ended. Otherwise, the method jumps back to step S2, in order to select a further POI cluster in the search field and to process it according to the step sequence described above. It is understood that the sequence of the comparison steps S7 and S8 represented in FIG. 2 and described here can be exchanged without thereby influencing the POI determination, in that the elapsed search time (t) is first compared with the predetermined search time ($t_S$) (S8) and then the number of POI hits (N) is compared with the predetermined number of POI hits ($N_S$).

The threshold value (T) shortens the predetermined search time ($t_S$) by a predetermined time margin ($\Delta t$). This prevents the (absolutely) predetermined search time ($t_S$) from being exceeded during two consecutive determinations of the search time. The time margin ($\Delta t$) is predetermined by the user. As an alternative thereto, the value of the time margin ($\Delta t$) can be predetermined in a fixed manner or be in a fixed ratio in relation to the predetermined search time ($t_S$).

In the manner described here, after each POI cluster the current number of POI hits (N) and the elapsed search time (t) are compared with the predetermined values for the number of POI hits ($N_S$) and the search time ($t_S$) and, if the predetermined number of POI hits ($N_S$) or the predetermined search time ($t_S$) is exceeded, the search operation is terminated. It is understood that the steps S9 and S10, which each constitute a termination criterion for the POI search, can also be performed after each POI hit or only after processing of a plurality of POI clusters.

If, in step S2, all POI clusters of the search field have already been selected for processing or if the initial search field does not include any POI clusters, the method continues with step S9. In this case, the search field is first subjected to a comparison, the search operation then being terminated if a current search field size (A) exceeds a predetermined threshold value ($A_M$) for the search field size. Otherwise, the determination means 1040 is used to enlarge the search field in step S10, the new, enlarged search field constituting the starting point for a continuation of the POI search on the basis of new, as yet unprocessed POI clusters. The enlargement of the search field is effected in such a way that the search field area is doubled upon the enlargement of the search field. Thus, in the case of a rectangular search field, its diagonal is enlarged by the factor $\sqrt{2}$.

Figure 2:
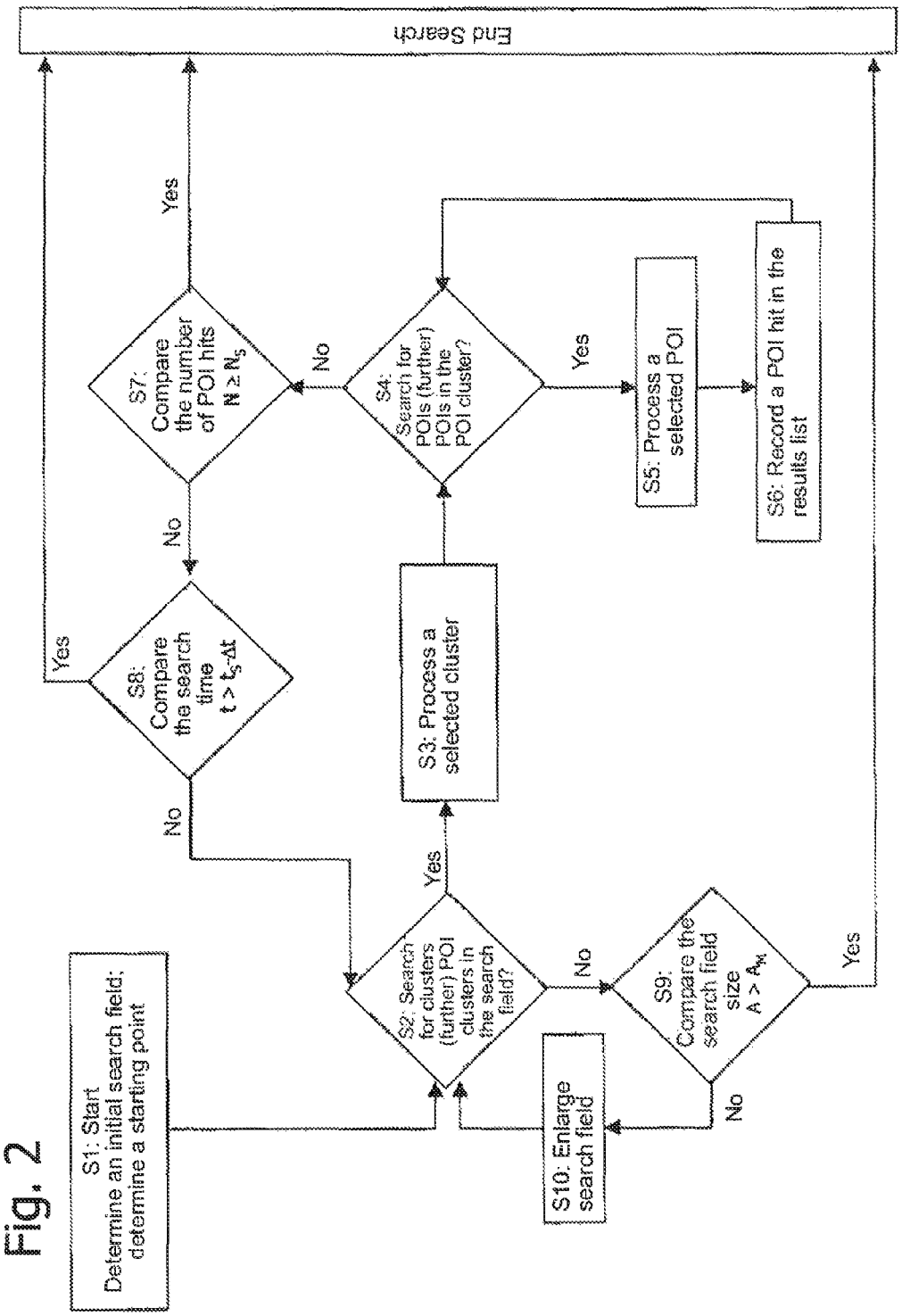
FIG. 2 shows a method according to an embodiment of the present invention

The method represented in FIG. 2 and described above thus enables POIs in the vicinity of a predetermined (located) location to be determined in a rapid manner that is sparing of resources, in that a search time and/or number of POI hits is/are predetermined as a termination criterion for the search operation. The size of the search field is not predetermined as a parameter (for example, through specification of a search radius), but is iteratively enlarged on the basis of an initial search field. In this way, it is possible for the POI search to be limited to a limited search time and few POI hits, irrespective of the predetermined location.

The invention claimed is:

1. A method for determining points of interest, or POIs, in a vicinity of a predetermined location with known coordinates, on the basis of digital cartographic data and a predetermined search time and a predetermined number of POI hits, the method being performed in a navigation device and comprising the following steps:
   determining, by a processor of the navigation device, on the basis of the cartographic data, a size of an initial search field that includes the predetermined location, wherein the size of the initial search field is determined on the basis of stored local POI densities that are assignable to the cartographic data;
   searching, by the processor, for POIs in the search field; and
   iteratively enlarging, by the processor, a size of the search field and searching for POIs in the enlarged search field until the predetermined search time has elapsed or the number of found POIs attains the predetermined number of POI hits.

2. The method according to claim 1, wherein the POIs are divided into classes, and wherein POIs of at least one predetermined POI class are searched.

3. The method according to claim 2, wherein the search time and number of POI hits are predetermined for each of the at least one predetermined POI class, and wherein the search field is enlarged until the predetermined search time has elapsed or NS POI hits are attained for each predetermined POI class.

4. The method according to claim 1, wherein POI determination in the search field is performed on the basis of POI clusters, wherein POIs that are geographically close to one another are combined to form a POI cluster.

5. The method according to claim 4, wherein a search field is enlarged when all POI clusters present in the search field have been processed for POI determination.

6. The method according to claim 1, further comprising determining an elapsed search time during POI determination, and comparing the elapsed search time with the predetermined search time, the elapsed search time being calculated from the commencement of the POI search.

7. The method according to claim 1, wherein the predetermined search time has a threshold value, upon the attainment of which the POI search is terminated, the threshold value being calculated from a difference of the predetermined search time and a time margin.

8. The method according to claim 7, wherein the time margin is determined relative to the predetermined search time.

9. The method according to claim 1, wherein the search field is enlarged until the size of the search field has attained a predetermined threshold value for the search field size.

10. The method according to claim 1, further comprising classifying the found POIs in dependence on their distance from the predetermined location and recording the classified POIs in a results list.

11. A non-transitory computer readable recording medium storing a computer program product having program code for performing the method according to claim 1.

12. A device for determining points of interest, or POIs, in a vicinity of a predetermined location with known coordinates, on the basis of digital cartographic data and a predetermined search time and a predetermined number of POI hits, comprising:
   a data memory for storing digital cartographic data;
   a determination means for determining, on the basis of the cartographic data, a size of an initial search field that includes the predetermined location and to iteratively enlarge a size of the search field until the predetermined search time has elapsed or the number of found POIs attains the predetermined number of POI hits, wherein the size of the initial search field is determined on the basis of stored local POI densities that are assignable to the cartographic data; and
   a search means for searching for POIs in the search field.

13. The device according to claim 12, further comprising:
   an input means for inputting a predetermined search time and/or a predetermined number of POI hits;
   a means for determining the search time and number of POI hits during POI determination;

a classifying means for classifying found POIs in dependence on their distance from the predetermined location and to record them in a results list; and an output means for indicating the results list.

14. The device according to claim 12, wherein the data memory further comprises a POI database, in which POIs that are geographically close to one another are combined and stored as POI clusters.

15. The device according to claim 13 or 14, further comprising a means for establishing an online connection to a network, in order to retrieve at least one of preprocessed cartographic data and POI data for POI determination.

* * * * *